United States Patent
Tsujita

(10) Patent No.: US 12,036,824 B2
(45) Date of Patent: Jul. 16, 2024

(54) TRANSMITTER

(71) Applicant: PACIFIC INDUSTRIAL CO., LTD., Gifu-ken (JP)

(72) Inventor: Yasuhisa Tsujita, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 394 days.

(21) Appl. No.: 17/297,638

(22) PCT Filed: Dec. 13, 2018

(86) PCT No.: PCT/JP2018/045868
§ 371 (c)(1),
(2) Date: May 27, 2021

(87) PCT Pub. No.: WO2020/121476
PCT Pub. Date: Jun. 18, 2020

(65) Prior Publication Data
US 2022/0032696 A1 Feb. 3, 2022

(51) Int. Cl.
*B60C 23/04* (2006.01)
*B60R 16/027* (2006.01)
*H04L 9/40* (2022.01)

(52) U.S. Cl.
CPC ...... *B60C 23/0408* (2013.01); *B60C 23/0486* (2013.01); *B60R 16/027* (2013.01); *H04L 9/40* (2022.05)

(58) Field of Classification Search
CPC ........... H04L 9/40; H04L 12/28; H04L 29/04; H04L 29/06; H04W 4/44; B60C 23/0486;
(Continued)

(56) References Cited

U.S. PATENT DOCUMENTS 9,522,579 B1 * 12/2016 McIntyre ............ B60C 23/0408
2013/0038440 A1 * 2/2013 Deniau ............... B60C 23/0455
340/447
(Continued)

FOREIGN PATENT DOCUMENTS

JP 2004145474 A 5/2004
JP 2010533612 A 10/2010
(Continued)

OTHER PUBLICATIONS

Dolev, Shlomi, and Nisha Panwar. "Peripheral Authentication for Parked Vehicles over Wireless Radio Communication." arXiv preprint arXiv:1807.11685 (2018). (Year: 2018).*
(Continued)

*Primary Examiner* — Cuong H Nguyen
(74) *Attorney, Agent, or Firm* — CANTOR COLBURN LLP

(57) ABSTRACT

A transmitter is attached to each of wheel assemblies of a vehicle and transmits transmission data to a receiver. The transmitter includes a nonvolatile memory that stores multiple types of protocols, a volatile memory that stores selection information, and a transmitting unit. The selection information represents a protocol that is selected from the multiple types of protocols stored in the nonvolatile memory and corresponds to the receiver. The transmitting unit transmits transmission data conforming to a protocol. The transmitting unit transmits the transmission data conforming to the protocol represented by the selection information when the selection information is stored in the volatile memory. Also, the transmitting unit transmits the transmission data conforming to all the protocols stored in the nonvolatile memory when the selection information is not stored in the volatile memory.

4 Claims, 3 Drawing Sheets

(58) Field of Classification Search
CPC ............ B60C 23/0462; B60C 23/0471; B60C 23/02; B60C 23/0408; B60R 16/023
USPC .......................................... 340/445; 73/146.2
See application file for complete search history.

(56) References Cited

U.S. PATENT DOCUMENTS

| | | | | |
|---|---|---|---|---|
| 2015/0040465 | A1* | 2/2015 | Nelson | A01K 65/00 43/55 |
| 2021/0362553 | A1* | 11/2021 | Tsujita | B60C 23/04 |

FOREIGN PATENT DOCUMENTS

| | | | | |
|---|---|---|---|---|
| JP | 201271755 | A | 4/2012 | |
| JP | 2014091344 | A | 5/2014 | |
| JP | 6128143 | B2 | 5/2017 | |
| WO | WO-2016196505 | A1 * | 12/2016 | ......... B60C 23/0408 |
| WO | 2018011954 | A1 | 1/2018 | |

OTHER PUBLICATIONS

Naderiparizi, Saman, et al. an abstract of "Far Field Energy Harvesting and Backscatter Communication." Recent Wireless Power Transfer Technologies via Radio Waves 8.2 (2018): 143-151. (Year: 2018).*

Giri, Naresh Kumar. A dependable and secure approach for secret key establishment and operation in automotive CPS. Diss. 2018. (Year: 2018).*

S. Di Cairano and I. V. Kolmanovsky, "Real-time optimization and model predictive control for aerospace and automotive applications," 2018 Annual American Control Conference (ACC), Milwaukee, WI, USA, 2018, pp. 2392-2409, doi: 10.23919/ACC.2018. 8431585.*

Acharya, Samrat, et al. "Cybersecurity of smart electric vehicle charging: A power grid perspective." IEEE Access 8 (2020): 214434-214453.*

International Search Report for Application No. PCT/JP2018/045868 mailed Feb. 26, 2019.

* cited by examiner

| Memory Medium | Protocol | Code |
|---|---|---|
| Nonvolatile Memory | Protocol A | 01 |
| | Protocol B | 10 |
| | Protocol C | 11 |
| Volatile Memory | Protocol B | 10 |

| Synchronization Bit | Identification Information | Status | Flag | Pressure Data | Temperature Data | Error Correction Code |
|---|---|---|---|---|---|---|

TRANSMITTER

TECHNICAL FIELD

The present invention relates to a transmitter.

BACKGROUND ART

Patent Document 1 discloses a tire condition monitoring apparatus that includes a receiver and transmitters attached to wheel assemblies. Each transmitter includes a pressure sensor, which detects the pressure of a tire, a transmitting unit, and a controlling unit, which controls the transmitter. The transmitting unit transmits transmission data that contains a detection result detected by the pressure sensor. Since the protocol differs from one receiver to another, transmitters that correspond to the protocol of the receiver are selected and attached to the wheel assemblies.

PRIOR ART DOCUMENT

Patent Document

Patent Document 1: Japanese Laid-Open Patent Publication No. 2014-91344

SUMMARY OF THE INVENTION

Problems that the Invention is to Solve

Some types of transmitters are configured to select one of multiple types of protocols. This type of transmitter includes a nonvolatile memory, which stores multiple types of protocols, and a volatile memory, which stores selection information. The selection information refers to information indicating the selected one of multiple types of protocols. The controlling unit transmits transmission data that conforms to the protocol indicated by the selection information. Since a protocol that corresponds to each receiver can be selected, the transmitter is allowed to correspond to multiple types of receivers.

However, in order to select a desired protocol from multiple types protocols, this type of transmitter stores selection information in a volatile memory, so that the selection information can be rewritten. If the selection information stored in the volatile memory is unintentionally deleted, transmission data cannot be transmitted using the protocol corresponding to the receiver. The receiver thus may fail to receive the transmission data.

It is an objective of the present invention to provide a transmitter capable of allowing a receiver to receive transmission data even if the selection information stored in a volatile memory is deleted.

Means for Solving the Problems

To achieve the foregoing objective and in accordance with a first aspect of the present invention, a transmitter is attached to each of wheel assemblies of a vehicle and transmits transmission data to a receiver. The transmitter includes a nonvolatile memory, a volatile memory, and a transmitting unit. The nonvolatile memory stores multiple types of protocols. The volatile memory stores selection information. The selection information represents a protocol that is selected from the multiple types of protocols stored in the nonvolatile memory and corresponds to the receiver. The transmitting unit transmits transmission data conforming to a protocol. The transmitting unit transmits the transmission data conforming to the protocol represented by the selection information when the selection information is stored in the volatile memory. The transmitting unit also transmits the transmission data conforming to all the protocols stored in the nonvolatile memory when the selection information is not stored in the volatile memory.

If the selection information stored in the volatile memory is deleted, so that no selection information is stored in the volatile memory, the transmission data that conforms to all the protocols stored in the nonvolatile memory is transmitted. One of all the protocols corresponds to the receiver. Thus, even if the selection information stored in the volatile memory is deleted, the receiver is allowed to receive the transmission data.

In the above-described transmitter, a code may be assigned to each of the multiple types of protocols, and the selection information may be the code corresponding to the selected one of the multiple types of protocols.

This configuration reduces the amount of storage required to store the selection information as compared to a case in which the protocols themselves are stored.

In the above-described transmitter, when transmitting the transmission data conforming to all the protocols stored in the nonvolatile memory, the transmitting unit may transmit the transmission data that includes information indicating that the selection information is not stored in the volatile memory.

This configuration allows the receiver to recognize that no selection information is stored in the volatile memory.

Effects of the Invention

The present invention provides a transmitter capable of allowing a receiver to receive transmission data even if the selection information stored in a volatile memory is deleted.

MODES FOR CARRYING OUT THE INVENTION

A transmitter according to an embodiment will now be described.

Figure 1:
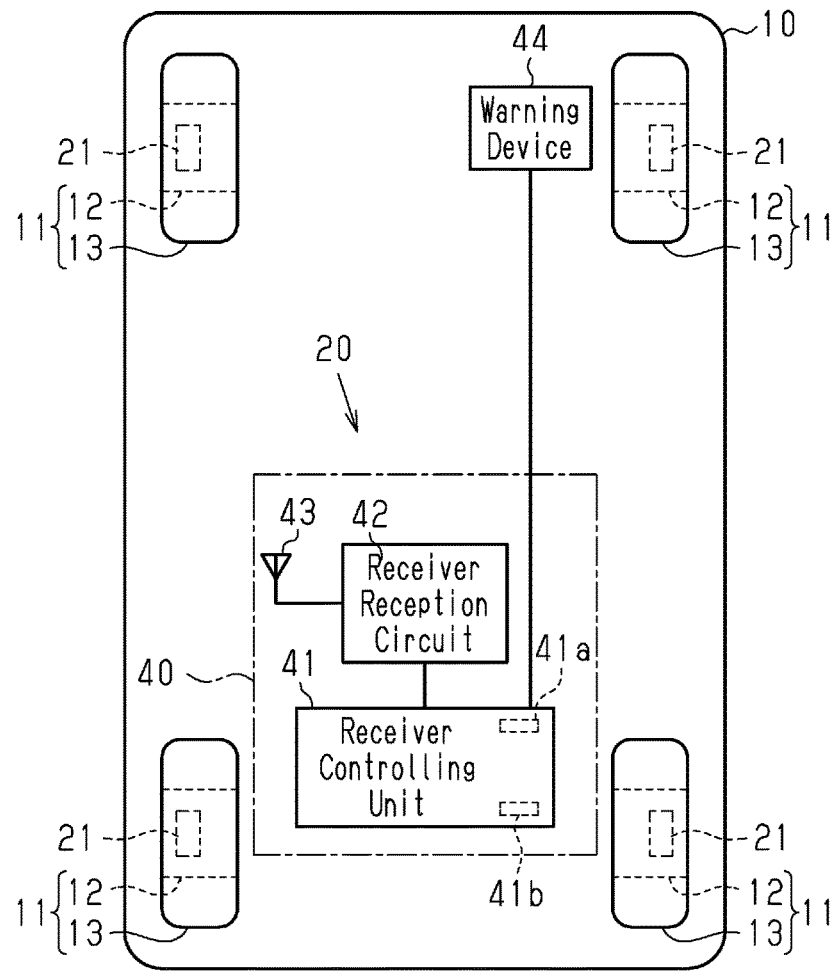
FIG. 1 is a schematic diagram showing the configuration of a tire condition monitoring apparatus.

As shown in FIG. 1, a tire condition monitoring apparatus 20 includes transmitters 21 and a receiver 40. Each transmitter 21 is attached to one of four wheel assemblies 11 of a vehicle 10. The receiver 40 is installed in the vehicle 10. Each wheel assembly 11 includes a wheel 12 and a tire 13 mounted on the wheel 12. The transmitter 21 is of a type that is fixed to a tire valve, a wheel 12, or a tire 13.

The transmitter 21 is attached to the wheel assembly 11 so as to be arranged in the internal space of the tire 13. The transmitter 21 detects a condition of the corresponding tire 13, for example, the air pressure and the internal temperature of the tire 13, and wirelessly transmits transmission data including the detection result to the receiver 40. The tire condition monitoring apparatus 20 monitors the condition of the tires 13 by receiving the transmission data transmitted from the transmitters 21 at the receiver 40.

Figure 2:
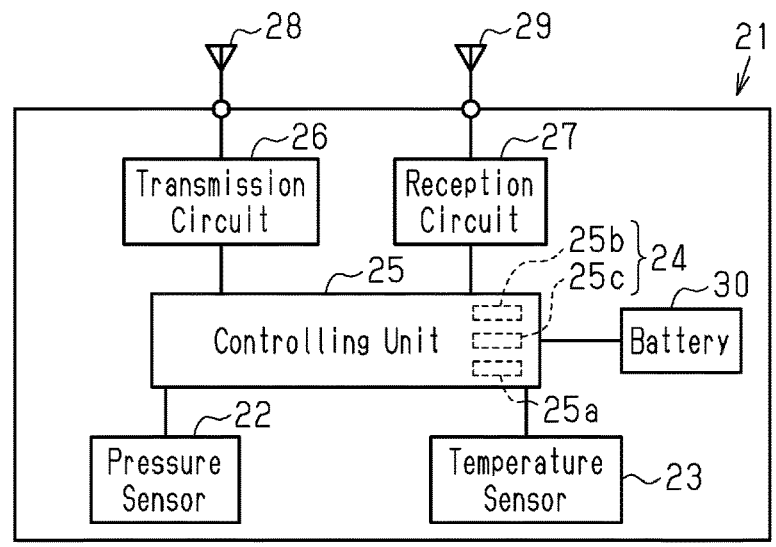
FIG. 2 is a schematic diagram showing the configuration of a transmitter.

As shown in FIG. 2, each transmitter 21 includes a pressure sensor 22, a temperature sensor 23, a controlling unit 25, a transmission circuit 26, a transmission antenna 28, a reception circuit 27, a reception antenna 29, and a battery 30. The battery 30 serves as a power source for the transmitter 21.

The pressure sensor 22 detects the pressure (air pressure) of the corresponding tire 13. The pressure sensor 22 outputs the detection result to the controlling unit 25. The temperature sensor 23 detects the temperature inside the corresponding tire 13. The temperature sensor 23 outputs the detection result to the controlling unit 25.

The controlling unit 25 includes a microcomputer including a CPU 25a and a memory unit 24. The memory unit 24 includes a nonvolatile memory 25b and a volatile memory 25c. The nonvolatile memory 25b stores an ID code, which is identification information unique to each transmitter 21, and various programs for controlling the transmitter 21.

The controlling unit 25 may include dedicated hardware (application specific integrated circuit (ASIC)) that executes at least part of various processes. That is, the controlling unit 25 may be circuitry including 1) one or more processors that operate according to a computer program (software), 2) one or more dedicated hardware circuits such as ASICs, or 3) a combination thereof. The processor includes a CPU and a memory such as a RAM and a ROM. The memory stores program codes or instructions configured to cause the CPU to execute processes. The memory, which is a computer readable medium, includes any type of media that are accessible by general-purpose computers and dedicated computers.

Figures 3, 4, 5:
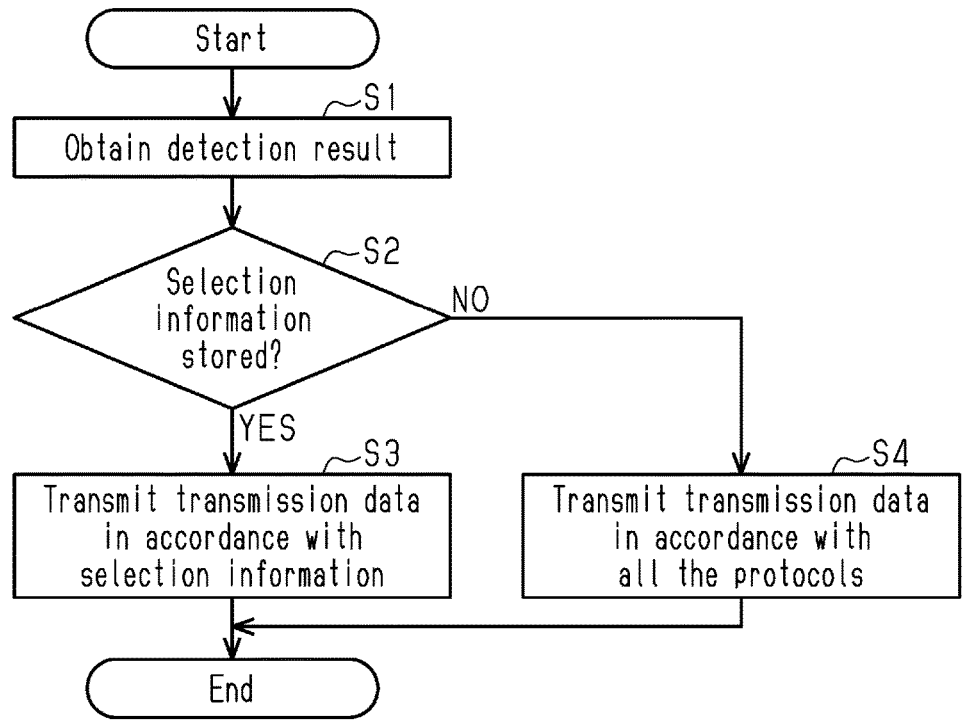
FIG. 3 is a diagram showing protocols stored in a non-volatile memory and selection information stored in volatile memory.
FIG. 4 is a diagram showing an example of a frame format.
FIG. 5 is a flowchart showing a process executed by a controlling unit.

As shown in FIG. 3, the nonvolatile memory 25b stores multiple types of protocols in predetermined memory areas. That is, the nonvolatile memory 25b stores information related to frame formats and procedures that correspond to the multiple protocols. Although FIG. 3 shows an example in which the nonvolatile memory 25b stores three protocols (i.e. a protocol A, a protocol B, and a protocol C), the number of the stored protocols varies depending, for example, on the type of the vehicle in which the transmitters 21 are used.

FIG. 4 shows an example of the frame format specified by the protocol A. A frame format refers to a format of transmission data transmitted to the receiver 40 and indicates what information is represented by each of the bits forming the transmission data.

A frame format includes a synchronization bit, identification information, a status, a flag, pressure data, temperature data, and an error correction code. The synchronization bit is data used to synchronize transmission and reception. The identification information is data that represents an ID code. The status is data that represents the state of the transmitter 21. The pressure data represents a detection result provided by the pressure sensor 22 (pressure value). The temperature data represents a detection result provided by the temperature sensor 23 (temperature). The error correction code is data that represents an error correction code or an error detection code. The flag is data that indicates whether there is an anomaly in the transmitter 21. For example, the flag is 1-bit data, which is 0 when there is no anomaly in the transmitter 21, and is 1 when there is an anomaly in the transmitter 21.

Like the protocol A, the frame formats specified by the protocols B and C of the present embodiment each include a synchronization bit, identification information, a status, a flag, pressure data, temperature data, and an error correction code. Among the frame formats of the protocols A, B, and C, for example, the order of the flag, the pressure data, and the temperature data varies. That is, the frame formats of the protocols A, B, and C differ with regard to which of the bits of the transmission data represents the flag, the pressure data, or the temperature data.

As shown in FIG. 3, the volatile memory 25c stores selection information, which represents a protocol selected from the multiple types of protocols, in a predetermined memory area. In the present embodiment, a code expressed by a data string of binary numbers is assigned to each of the protocols A, B, and C, and the codes corresponding to the selected protocol is stored in the volatile memory 25c. In the example shown in FIG. 3, codes 01, 10, and 11 are associated with the protocol A, the protocol B, and the protocol C, respectively. In the example shown in FIG. 3, the volatile memory 25c stores the code 10, which is associated with the protocol B. This shows that the protocol B has been selected from the protocols A, B, and C. In the present embodiment, the value of the predetermined memory area is 00 when no selection information is stored.

The protocol stored in the volatile memory 25c, that is, the selected one of the multiple types of protocols, is determined in correspondence with the protocol of the receiver 40. If the protocol is different, the frame format and the procedure are also different. Accordingly, if the transmission data does not correspond to the protocol of the receiver 40, the transmission data cannot be received by the receiver 40. The receiver 40 differs depending on the type of vehicle. In other words, the frame format varies depending on the type of vehicle. The selection information is written into the volatile memory 25c using an external device such as a trigger device.

The controlling unit 25 generates transmission data according to the protocol and outputs it to the transmission circuit 26. The transmission circuit 26, which functions as a transmitting unit, modulates the transmission data from the controlling unit 25 to generate a wireless signal (RF signal), and transmits it through the transmission antenna 28. For example, the controlling unit 25 generates a transmission data that includes the ID code and the tire condition, which includes the detection result of the pressure sensor 22 and the detection result of the temperature sensor 23 (the tire air pressure and the tire internal temperature). The controlling unit 25 transmits a wireless signal, which includes the transmission data.

The controlling unit 25 has a diagnosis function of diagnosing failures of the pressure sensor 22 and the temperature sensor 23. When determining that the pressure sensor 22 or the temperature sensor 23 has a failure using the diagnosis function, the controlling unit 25 sets a flag. That is, the controlling unit 25 generates transmission data in which the flag has a value of 1. Accordingly, the transmission data includes data that causes the receiver 40 to recognize an anomaly of the pressure sensor 22 or the temperature sensor 23. A failure diagnosis for the pressure sensor 22 and the temperature sensor 23 is performed by using the detection results of the pressure sensor 22 and the temperature sensor 23, for example. The detection results of the pressure sensor 22 and the temperature sensor 23 are obtained by converting analog signals into digital signals using an AD converter provided in the controlling unit 25. At this time, if overflow or underflow occurs in the AD converter, the controlling unit 25 determines that there is a failure in the pressure sensor 22 or the temperature sensor 23. The controlling unit 25 is also capable of detecting broken lines and short circuits in the pressure sensor 22 and the temperature sensor 23.

The reception circuit 27 receives a signal delivered from an external device such as a trigger device through the reception antenna 29. The signal contains a command for the transmitter 21, and the controlling unit 25 executes a process in accordance with the command. This, for example, causes the selection information to be written into the volatile memory 25c.

The process executed by the controlling unit 25 when transmitting transmission data will now be described. The controlling unit 25 periodically transmits transmission data to the receiver 40.

As shown in FIG. 5, the controlling unit 25 obtains detection results from the pressure sensor 22 and the temperature sensor 23 in step S1.

Next, in step S2, the controlling unit 25 determines whether selection information is stored in the volatile memory 25c. If no selection information is stored in the volatile memory 25c, it is likely that the selection information stored in the volatile memory 25c has been deleted due to resetting of the controlling unit 25, external noise such as an intense electric field, or software failure. The controlling unit 25 is reset, for example, when a watchdog timer detects a failure, when the temperature of the controlling unit 25 has increased excessively, when an error occurs in the data stored in the volatile memory 25c, or when the voltage of the battery 30 has decreased significantly. When the selection information of the volatile memory 25c is deleted, the memory area designed to store selection information is initialized, so that the protocol is yet to be selected. The controlling unit 25 is thus capable of determining whether selection information is stored in the volatile memory 25c by detecting that resetting has been performed or checking whether the selection information is stored in the volatile memory 25c.

If the process of step S2 is affirmative, the controlling unit 25 executes the process of step S3. If the process of step S2 is negative, the controlling unit 25 executes the process of step S4.

In step S3, the controlling unit 25 generates transmission data in accordance with the frame format that corresponds to the protocol represented by the selection information stored in the volatile memory 25c, and transmits the transmission data. That is, if selection information is stored in the volatile memory 25c, transmission data conforming to the protocol selected based on the selection information is transmitted. In the present embodiment, a code corresponding to the protocol is stored as the selection information. Thus, the controlling unit 25 reads, from the nonvolatile memory 25b, the protocol that corresponds to the code stored in the volatile memory 25c, and generates transmission data. The protocol selected based on the selection information corresponds to the receiver 40 and thus allows the receiver 40 to receive the transmission data.

In step S4, the controlling unit 25 generates transmission data in accordance with the frame formats that correspond to all the protocols stored in the nonvolatile memory 25b, and transmits the transmission data. That is, if no selection information is stored in the volatile memory 25c, transmission data conforming to all the protocols stored in the nonvolatile memory 25b is transmitted. When generating data, the controlling unit 25 generates transmission data in which the flag is set, that is, the flag has a value of 1. The flag having a value of 1 is information indicating that no selection information is stored in the volatile memory 25c.

Figure 6:
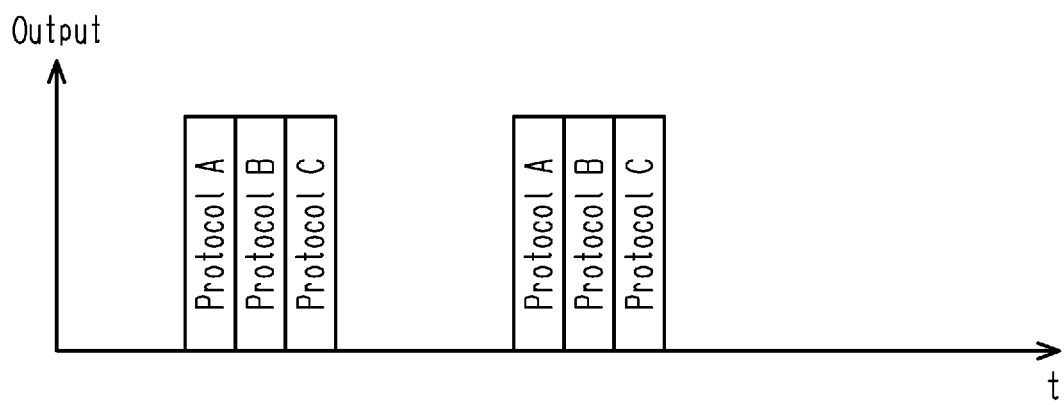
FIG. 6 is a timing diagram showing a case in which transmission data that conforms to all the protocols is transmitted in a single transmission event.

When transmission data conforming to all the protocols is transmitted, the transmission data conforming to all the protocols may be transmitted in a single transmission event as shown in FIG. 6. In this case, sets of transmission data each conforming to a different one of the protocols are generated, and the sets of transmission data conforming to the protocols are transmitted periodically. Therefore, the same number of sets of transmission data as the number of the protocols stored in the nonvolatile memory 25b are transmitted in each transmission event.

Figure 7:
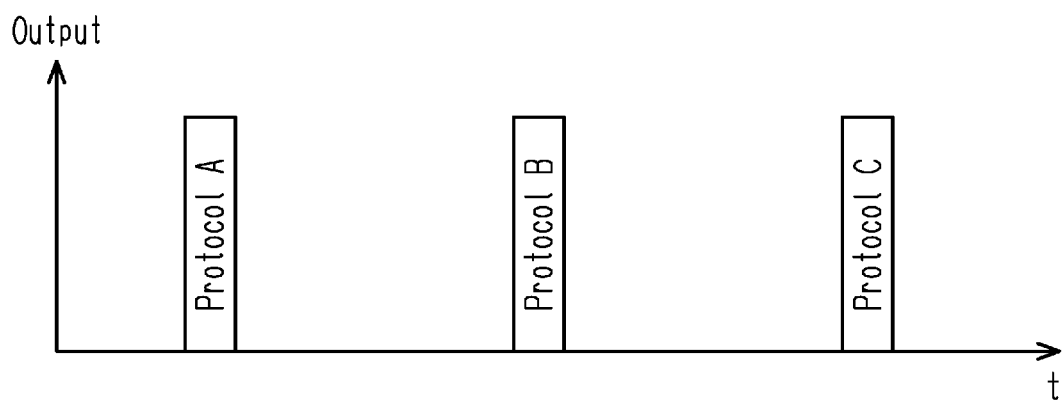
FIG. 7 is a timing diagram showing a case in which transmission data that conforms to different protocols is transmitted in different transmission events.

When the transmission data conforming to all the protocols is transmitted, sets of the transmission data conforming to different protocols may be transmitted in different transmission events as shown in FIG. 7. In this case, each time the transmission data is transmitted periodically, a set of transmission data conforming to a different protocol is generated and transmitted. Accordingly, the sets of transmission data conforming to the different protocols are transmitted sequentially. In the case of the present embodiment, transmission of the sets of the transmission data may be performed in the order of the transmission of the set of transmission data conforming to the protocol A, the transmission of the set of transmission data conforming to the protocol B, and the transmission of the set of transmission data conforming to the protocol C.

As shown in FIG. 1, the receiver 40 includes a receiver controlling unit 41, a receiver reception circuit 42, and a reception antenna 43. The receiver controlling unit 41 is connected to a warning device 44. The receiver controlling unit 41 includes a microcomputer including a receiver CPU 41a and a receiver memory unit 41b (such as a ROM and a RAM). The receiver reception circuit 42 demodulates data transmission data received from each transmitter 21 via the reception antenna 43, and delivers the demodulated data to the receiver controlling unit 41.

The receiver memory unit 41b stores the ID codes of the transmitters 21 attached to the wheel assemblies 11. With this, the transmitters 21 are associated with the receiver 40. The receiver controlling unit 41 checks the ID code in the transmission data received by the receiver reception circuit 42 against the ID codes stored in the receiver memory unit 41b. If the ID code included in the transmission data agrees with any of the registered ID codes, the receiver controlling unit 41 accepts the data in the transmission data. The receiver controlling unit 41 acquires the condition of the tire 13 from the data included in the transmission data transmitted from the transmitter 21 associated with the receiver 40. The receiver controlling unit 41 performs notification by using the warning device (notification device) 44 when the pressure of the tire 13 is lower than a threshold or when recognizing that there is an anomaly in the transmitter 21 based on the flag included in the received transmission data. The warning device 44 may be, for example, a device that performs notification of an anomaly using sound, illumination of light, or blinking of light. Also, the receiver controlling unit 41 may display the condition of the tire 13 on the display device, which can be visually recognized by the occupants of the vehicle 10. The warning device 44 may separately include a device that performs notification when there is an anomaly in any of the tires 13 and a device that performs notification when there is an anomaly in any of the transmitters 21. Alternatively, the warning device 44 may include a single device that performs notification when there is an anomaly in any of the tires 13 and performs notification when there is an anomaly in any of the transmitters 21.

An operation of the present embodiment will now be described.

In a case in which selection information is stored in the volatile memory 25c, the transmitter 21 transmits transmission data in accordance with the protocol that corresponds to the receiver 40. This allows the receiver 40 to receive the transmission data.

If the selection information that is stored in the volatile memory 25c is deleted, no selection information is stored in the volatile memory 25c. In this case, the transmitter 21 transmits transmission data in accordance with all the protocols stored in the nonvolatile memory 25b. A transmitter in which one of the multiple types of protocols stored in the nonvolatile memory 25b corresponds to the receiver 40 is selected as the transmitter 21 and attached to the wheel assembly 11. One of all the protocols corresponds to the receiver 40. Therefore, when transmission data is transmitted in accordance with all the protocols, one set of the transmission data can be received by the receiver 40.

If the receiver 40 cannot receive transmission data when the selection information is deleted from the volatile memory 25c, it is impossible to perform notification of an anomaly in the tire 13, such as an excessive drop of the pressure of the tire 13. However, the transmitter 21 of the present embodiment allows the receiver 40 to receive transmission data even when the selection information is deleted from the volatile memory 25c. Therefore, even if an anomaly occurs in the tire 13 after the selection information is deleted from the volatile memory 25c, it is possible to perform notification of the anomaly.

When no selection information is stored in the volatile memory 25c, the flag in the transmission data allows the receiver 40 to recognize an anomaly in the transmitter 21. When receiving transmission data that includes a flag having a value of 1, the receiver 40 causes the warning device 44 to perform warning.

The present embodiment has the following advantages.

(1) If no selection information is stored in the volatile memory 25c, the controlling unit 25 transmits transmission data conforming to all the protocols stored in the nonvolatile memory 25b. Thus, even if the selection information stored in the volatile memory 25c is deleted, the receiver 40 is allowed to receive the transmission data.

(2) The code corresponding to the selected protocol is stored in the volatile memory 25c as selection information. This reduces the amount of storage required to store the selection information as compared to a case in which the protocol itself is stored in the volatile memory 25c.

(3) If no selection information is stored in the volatile memory 25c, the controlling unit 25 generates transmission data that includes information indicating that no selection information is stored in the volatile memory 25c. This allows the receiver 40 to recognize that no selection information is stored in the volatile memory 25c. In the present embodiment, the receiver 40 performs notification using the warning device 44 when no selection information is stored in the volatile memory 25c. This allows the occupants to be notified of an anomaly in the transmitter 21.

(4) The flag that is used when an anomaly of the pressure sensor 22 or the temperature sensor 23 occurs is also used as the flag indicating that no selection information is stored. Therefore, if an existing frame format includes a flag that is used when there is an anomaly in the pressure sensor 22 or the temperature sensor 23, it is possible to perform, without modifying the frame format, notification of no selection information being stored.

(5) In order to prevent the receiver 40 from being unable to receive transmission data, transmission data conforming to all the protocols stored in the nonvolatile memory 25b may be transmitted constantly. This would increase the power consumption and shorten the life of the battery 30. However, the transmitter 21 of the present embodiment transmits transmission data conforming to all the protocols only when selection information is deleted from the volatile memory 25c. This reduces the power consumption. The life of the battery 30 is therefore prevented from being shortened as compared to a case in which the transmission data conforming to all the protocols is transmitted constantly.

(6) If the selection information is stored in a rewritable nonvolatile memory such as an EEPROM or a flash memory, it is difficult to write the selection information into the nonvolatile memory after production of the transmitter 21. However, the use of the volatile memory 25c facilitates writing of the selection information using an external device such as a trigger device.

Typically, in the transmitter 21 that selects one of multiple types of protocols, the selection information is often stored in the volatile memory 25c. Thus, the hardware does not need to be changed unlike a case in which the selection information is stored in a rewritable nonvolatile memory such as an EEPROM or a flash memory. This limits an increase in the manufacturing costs.

The embodiment may be modified as follows.

When no selection information is stored in the volatile memory 25c, the controlling unit 25 does not necessarily need to transmit transmission data that includes information indicating that no selection information is stored in the volatile memory 25c.

In place of the code associated with one of the multiple types of protocols, the data of the protocol itself may be stored in the volatile memory 25c as the selection information. In this case, the controlling unit 25 reads the protocol stored in the volatile memory 25c to generate the transmission data.

When the transmission data conforming to all the protocols is transmitted, the controlling unit 25 may transmit the transmission data over multiple transmission events. An example assumes that eight types protocols A, B, C, D, E, F, G, and H are stored in the nonvolatile memory 25b.

When no selection information is stored in the volatile memory 25c, transmission data conforming to four of the protocols may be transmitted in one transmission event, and transmission data conforming to the other four of the protocols may be transmitted afterwards. The controlling unit 25 may repeat this procedure to transmit the transmission data conforming to all the protocols.

The frequency at which the transmission data is transmitted may be different among protocols. For example, when the transmission data conforming to four protocols is transmitted in a single transmission event, two of the four protocols may be fixed protocols, and the other two protocols may be changed in each transmission event. For example, the transmission data may be transmitted in the order of a set of the protocols A, B, C, D, a set of the protocols A, B, E, F, and a set of the protocols A, B, G, H. Protocols conforming to widely available types of the receiver 40 are selected as the protocols A and B.

When transmission data is transmitted over multiple transmission events, the types and number of the protocols may be changed for each transmission event. For example, transmission data conforming to four protocols may be transmitted in a transmission event subsequent to a transmission event in which transmission data conforming to three protocols are transmitted.

When transmission data conforming to multiple types of protocols is transmitted in a single transmission event, the protocols may be selected randomly.

Also, even when all the protocols are not transmitted over multiple transmission events, the frequency of the protocols and the types of protocols that are transmitted in a single transmission event may be changed.

The intervals between transmission events, in which the transmission data is transmitted, do not necessarily need to be equal. In this case, the intervals between transmission events may be set randomly.

The value of the volatile memory 25c when no selection information is stored may be a value other than 00. That is, the value of the volatile memory 25c when no selection information is stored may be any value as long as it is stored when the controlling unit 25 is reset.

The same data set may be stored in multiple memory areas in the volatile memory 25c. With this configuration, when two or more these memory areas are referred to and the stored data sets are different, it is determined that garbled data has occurred accidentally and reset is performed immediately. Alternatively, the correct data set can be determined based on majority rule.

The controlling unit 25 may execute the process according to any procedure as long as the controlling unit 25 is capable of transmitting the transmission data conforming to the protocol specified by the selection information when the selection information is stored, and transmitting the transmission data conforming to all the protocols when no selection information is stored.

The transmitter 21 only needs to be able to detect one of the conditions of the tire 13. For example, it suffices if the transmitter 21 is capable of detecting either the pressure of the tire 13 or the temperature of the tire 13. The transmitter 21 may detect a condition of the tire 13 other than the pressure and the temperature. In this case, the transmitter 21 may include a sensor suited for the condition desired to be detected.

The transmission data may include a flag dedicated to causing the receiver 40 to recognize that no selection information is stored in the volatile memory 25c. That is, the data set designed to cause the receiver 40 to recognize an anomaly in the pressure sensor 22 or the temperature sensor 23 may be different from the data set designed to cause the receiver 40 to recognize that no selection information is stored in the volatile memory 25c.

The protocols may be different in the transmission interval of the transmission data, the resolution of the pressure data or the temperature data, and types of data included in the frame format.

The vehicle may be a two-wheel vehicle or a vehicle having five or more wheel assemblies 11.

The receiver 40 may be a portable terminal carried by an occupant of the vehicle 10.

DESCRIPTION OF THE REFERENCE NUMERALS

10 . . . Vehicle; 11 . . . Wheel Assembly; 13 . . . Tire; 21 . . . Transmitter; 25b . . . Nonvolatile Memory; 25c . . . Volatile Memory; 26 . . . Transmission Circuit (Transmitting Unit); 40 . . . Receiver

The invention claimed is:

1. A transmitter that is attached to each wheel assembly a vehicle and transmits transmission data to a receiver, the transmitter comprising:
   a nonvolatile memory configured to store multiple types of protocols;
   a volatile memory configured to store selection information, the selection information representing a protocol that is selected from the multiple types of protocols stored in the nonvolatile memory and corresponds to the receiver; and
   a transmission circuit configured to transmit transmission data conforming to the protocol,
   wherein the transmission circuit is configured to:
      transmit transmission data conforming to the protocol represented by the selection information in response to the selection information being stored in the volatile memory, and
      transmit the transmission data that conforms to all the protocols stored in the nonvolatile memory and includes information indicating that the selection information is not stored in the volatile memory in response to the selection information being not stored in the volatile memory.

2. The transmitter according to claim 1, wherein
   a code is assigned to each of the multiple types of protocols, and
   the selection information is the code corresponding to the selected one of the multiple types of protocols.

3. A method of operating a transmitter that is attached to each of wheel assemblies of a vehicle and transmits transmission data to a receiver, the method comprising:
   storing multiple types of protocols in a nonvolatile memory;
   storing selection information in a volatile memory, the selection information representing a protocol that is selected from the multiple types of protocols stored in the nonvolatile memory and corresponds to the receiver;
   transmitting the transmission data conforming to the protocol represented by the selection information in response to the selection information being stored in the volatile memory; and
   transmitting the transmission data that conforms to all the protocols stored in the nonvolatile memory and includes information indicating that the selection information is not stored in the volatile memory in response to the selection information being not stored in the volatile memory.

4. The method according to claim 3, wherein
   a code is assigned to each of the multiple types of protocols, and
   the selection information is the code corresponding to the selected one of the multiple types of protocols.

* * * * *